US008219578B2

(12) United States Patent
Hendrey et al.

(10) Patent No.: US 8,219,578 B2
(45) Date of Patent: Jul. 10, 2012

(54) HIGH PRECISION INTERNET LOCAL SEARCH

(75) Inventors: Geoffrey R. Hendrey, San Francisco, CA (US); Richard F. Poppen, San Jose, CA (US)

(73) Assignee: deCarta Inc., San Jose, CA (US)

( * ) Notice: Subject to any disclaimer, the term of this patent is extended or adjusted under 35 U.S.C. 154(b) by 542 days.

(21) Appl. No.: 11/608,791

(22) Filed: Dec. 8, 2006

(65) Prior Publication Data

US 2007/0143318 A1 Jun. 21, 2007

Related U.S. Application Data

(60) Provisional application No. 60/749,013, filed on Dec. 8, 2005.

(51) Int. Cl.
*G06F 17/30* (2006.01)

(52) U.S. Cl. .................................................... 707/769

(58) Field of Classification Search .................. 707/609, 707/705, 742, 758, 769, 790, 821, 830, 918
See application file for complete search history.

(56) References Cited

U.S. PATENT DOCUMENTS

| | | | | |
|---|---|---|---|---|
| 6,542,927 | B2 * | 4/2003 | Rhoads | 709/217 |
| 6,701,307 | B2 * | 3/2004 | Himmelstein et al. | 707/3 |
| 2002/0187831 | A1 * | 12/2002 | Arikawa et al. | 463/32 |
| 2005/0116966 | A1 | 6/2005 | Graham et al. | |
| 2005/0149561 | A1 | 7/2005 | Hodnett et al. | |

FOREIGN PATENT DOCUMENTS

| | | | |
|---|---|---|---|
| EP | 1072987 | A1 | 1/2001 |
| WO | WO 99/26129 | A | 5/1999 |
| WO | WO 00/25508 | A | 5/2000 |
| WO | WO 2005/062870 | A2 | 7/2005 |
| WO | WO 2005/111787 | A2 | 11/2005 |

OTHER PUBLICATIONS

Arikawa et al, Spatial Media Fusion Project, Proc. of the 2000 Kyoto International Conference on Digital Library: Research and Practice, IEEE Computer Society Press, Kyoto Japan, 2000, pp. 1-9.*

PCT International Search Report and Written Opinion, PCT/US06/47010, Mar. 5, 2008, 8 Pages.

First Office Action of China State Intellectual Property Office, Chinese Patent Application No. 200680052288.0, Jul. 24, 2009, 7 pages.

Supplementary European Search Report, European Patent Application No. EP06839250, Oct. 14, 2009, 7 Pages.

* cited by examiner

*Primary Examiner* — Fred I Ehichioya
(74) *Attorney, Agent, or Firm* — Fenwick & West LLP

(57) ABSTRACT

High-precision local search is performed on the Internet. A map image-rendering software provider embeds spatial keys into maps, which are then provided to producers of Internet content such as map providers. For example, a homeowner may post a message on a web bulletin board advertising his house for sale, and including a map showing the location of the house. When a search engine's web crawler encounters a page having a spatial key embedded in an image, the spatial key is indexed with the other content on the page. Because the spatial key identifies a small geographic area, indexing the content with the spatial key allows search queries to be limited by area and still provide useful results. Thus, a user of a search engine searching for "house for sale" in a specific area will be directed to web pages that meet the geographic and content search terms.

19 Claims, 6 Drawing Sheets

Crawl to web page 202

Retrieve map image from source 204

Extract spatial key and bounding box 206

Index spatial key and associated bounding box 208

Spatial key

Bounding box

Query's Area of interest

HIGH PRECISION INTERNET LOCAL SEARCH

CROSS-REFERENCE TO RELATED APPLICATIONS

This application claims the benefit of application No. 60/749,013, filed on Dec. 8, 2005, and which is incorporated by reference herein in its entirety.

BACKGROUND OF THE INVENTION

1. Field of the Invention

The present invention relates generally to searching the Internet. More specifically, the present invention is related to improving searches on the web by inserting searchable spatial keys into map images.

2. Description of the Related Art

Although search engines on the Internet are used to locate content from all over the world, they are not particularly useful for doing local searching. For example, a search engine will not produce very good results for the search query "house for sale within 3 miles of 1 Market Street, San Francisco, Calif". Some search engine providers have started maintaining local databases that include the locations of local businesses or other points of interest, thus enabling searches such as "Starbucks near 94114". However, this local search is expensive for search engines, because spatial indexing and searching requires the search provider to integrate new technology into both their index builder and search algorithm. To perform an accurate local search using traditional search engine technology, addresses must be scraped from websites, and geocoded to a latitude and longitude as part of the index-building process. Geocoding is error prone, slow, and expensive. Further, addresses are difficult to identify in web pages, and address formats are notoriously given in non-standard ways. Alternatively, some services like Yahoo! Yellow Pages use a geocoded-yellow pages database. Such databases are expensive, and require periodic updating—thus they are not a spatial search of the web, but are simply a spatial search of the Yellow Pages, a vastly smaller data set.

Accordingly, there is a need for a web searching technology that enables highly precise local web searching with minimal integration costs on the part of the search provider

SUMMARY OF THE INVENTION

The present invention enables high-precision local search to be performed on the Internet. A map image-rendering software provider embeds spatial keys into maps, which are then in turn provided to producers of Internet content such as map providers, advertisers, commercial web sites, personal web sites, etc. For example, a homeowner may post a message on a web bulletin board advertising his house for sale, and including a map showing the location of the house.

When a search engine's web crawler encounters a page having a spatial key embedded in an image, the spatial key is indexed along with the other content on the web page. Because the spatial key preferably identifies a small geographic area, indexing the content with the spatial key allows search queries to be limited by area and still provide useful results. Thus, in the example of the homeowner that advertises his house, a user of the search engine subsequently searching for "house for sale" in the homeowner's area will be directed to the homeowner's web page, as well as to other web pages that meet the geographic and content search terms.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The present invention enables high precision Internet local searching by embedding spatial keys into maps displayed as part of web pages. By indexing the spatial keys along with the related content of a web page, a search engine is thus able to return relevant content to queries for local information.

deCarta, Inc. of San Jose, Calif., provides a spatial search capability based on spatial keys. A spatial key is a numeric value, typically a 32-bit number, that can be used as a spatial reference and for spatial searching.

Spatial keys are described further in the document "Rich Map Engine Software Libraries: *Core, Route Finding, Attribute Edit, and Database Overlay* API Reference manual," and "Drill Down Server Reference Manual".

Many web pages, for example real-estate related web pages, already include maps related to the content of the page, e.g., the listed real-estate. Using the present invention, these maps are supplied with spatial keys included, thus using an existing distribution channel to attach the spatial key to a website hosting local content.

Using a system of the present invention, search engine web crawlers no longer need to perform geocoding of addresses. Even the simplest search engines without expensive geocoders can spatially index local content and perform highly sophisticated spatial search of the web.

Figure 1:
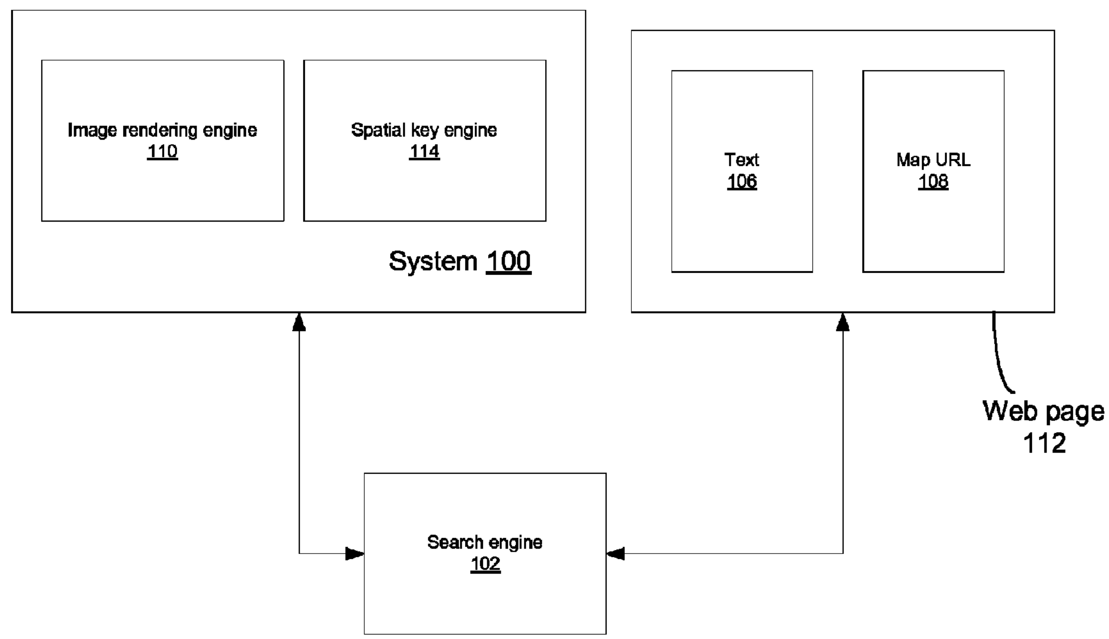
FIG. 1 illustrates one embodiment of a system 100 in which the present invention can be implemented.

FIG. 1 illustrates one embodiment of a system 100 in which the present invention can be implemented. A web page 112 includes text 106 as well as a reference 108 to a map URL. When image rendering software 110 receives a request for a map (at the URL specified by the map URL 108), it returns an image of the requested map, encoded with a spatial key and bounding box supplied by spatial key engine 114. When search engine 102 crawls to web page 112, it indexes the content of web page 112 along with the spatial key embedded in the map retrieved from system 100.

Figure 2:
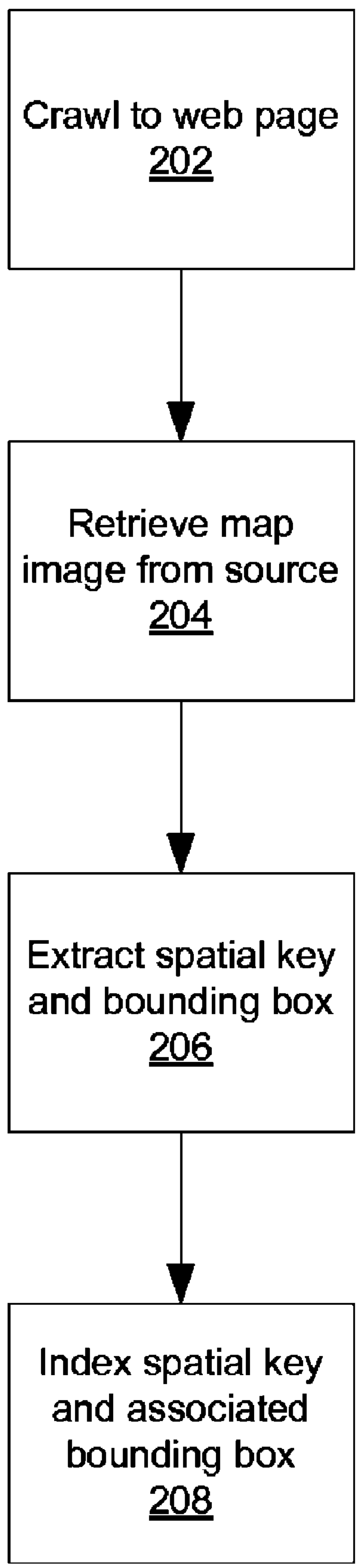
FIG. 2 is a flowchart illustrating a method for indexing a spatial key in association with a web page in accordance with an embodiment of the present invention.

FIG. 2 is a flowchart illustrating a method for indexing a web page and an associated spatial key in accordance with an embodiment of the present invention.

As described above, web page 112 includes a map showing the location of a thing being described in the web page (e.g., a real estate listing, a restaurant review, etc.).

Web search engine 102 crawls 202 the web and reaches web page 112. Note that search engine 102 may index web page 112 for a reason other than having crawled to it—for example, it may have been given an explicit instruction to index the page, or for some other reason.

Once search engine 102 has reached the page 112, it follows map URL 108 in order to retrieve 204 the map image from the source identified by the URL, which is typically listed in the HTML "image source" attribute for the map. As noted above and described further below, the map returned by image rendering engine 110 includes a spatial key embedded by spatial key engine 114, and in one embodiment also includes a bounding box.

Having retrieved the rendered map from system 100, search engine 102 next extracts 206 the spatial key and associated bounding box from the included binary data, and then indexes 208 the spatial key of the map in association with the web page's URL and content of the web page 112. Note that although in FIG. 1 the non-map contents of the page are identified as text 106, the contents could also be graphics, sound or other types of content without loss of generality.

In an alternative embodiment, the spatial bounding area is steganographically included in the map, without a spatial key. In such an embodiment, the indexing search engine 102 generates the spatial key or keys corresponding to the bounding area.

Figure 3:
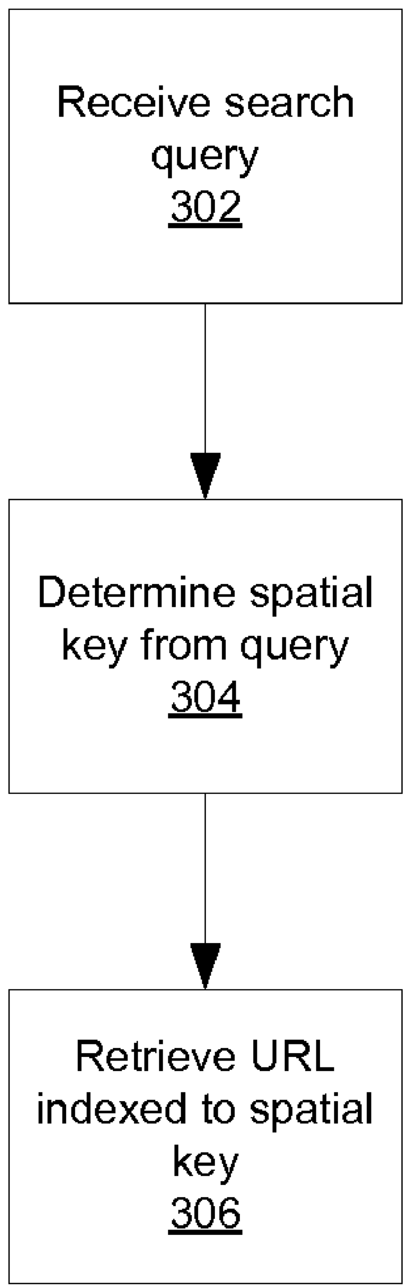
FIG. 3 is a flowchart illustrating a method for retrieving a URL associated with a spatial key in accordance with embodiment of the present invention.

Referring to FIG. 3, performing a search includes receiving 302 a search query, determining 304 a spatial key from the search query, and retrieving 306 URLs indexed to one or more of the spatial keys and the other query terms. For example, in one embodiment if a user visits search engine 102 and enters the query "find all homes for sale within 1 mile of Highway 101 North", search engine 102 determines the spatial keys covering Highway 101 North, and retrieves all URLs indexed to one or more of the spatial keys and to "homes for sale".

In one embodiment, the map image encodes a spatial key and bounding box. In this embodiment, the bounding box is defined by two points. As noted, the spatial key is a conventional technology for performing spatial indexing and search. A spatial key covers a defined geographic area that may be larger than the visible area displayed by the map. Therefore, the map image also preferably encodes a bounding box. In an alternative embodiment, a bounding area—capable of accommodating more than two points—is used. Web crawling search engine 102 records the spatial key and the bounding box of the map. An initial query executed against the search engine index may extract URLs from a range of spatial key values. Sub-filtering may be performed to eliminate URLs with bounding boxes that fall outside the area of interest of a query.

Figure 4:
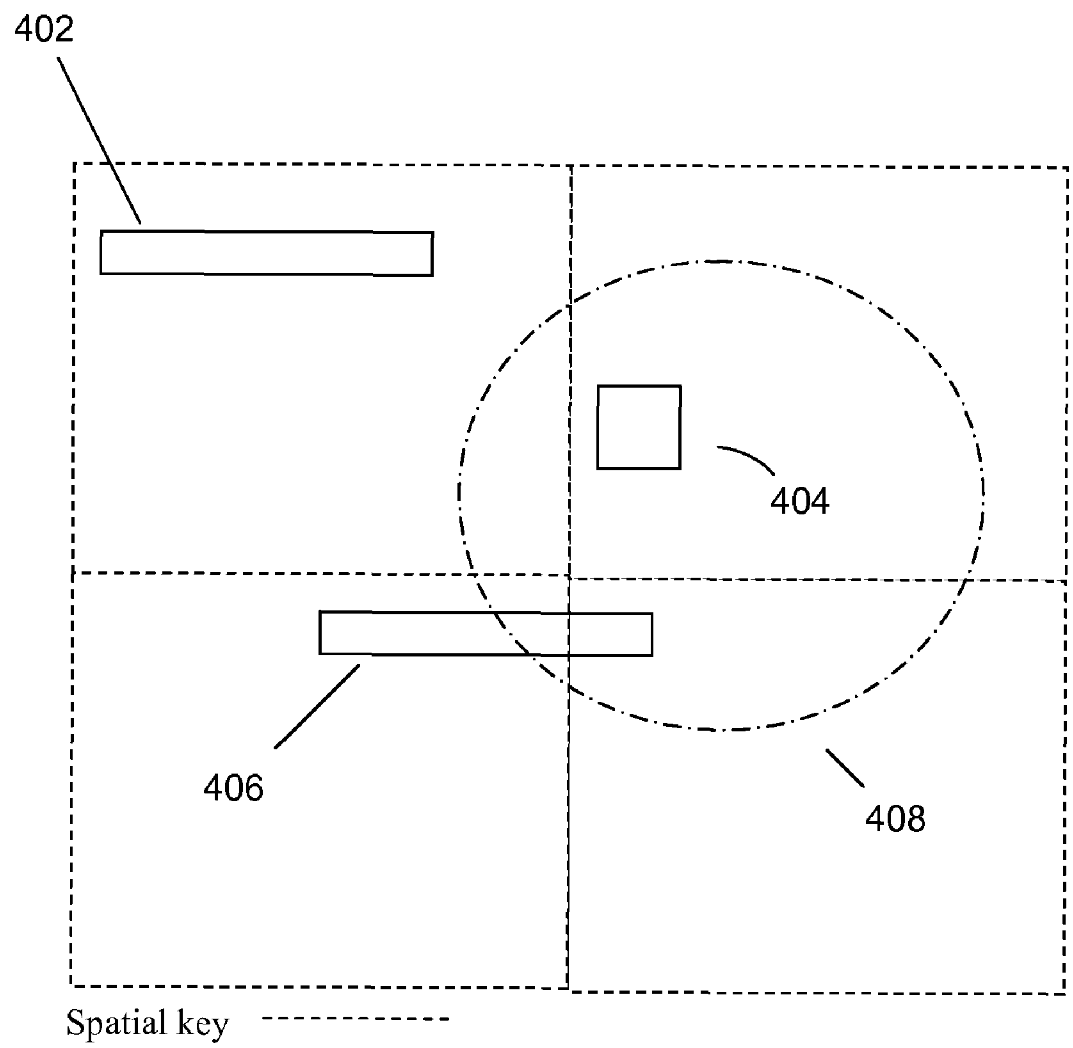
FIG. 4 illustrates how bounding boxes may be entirely within the area of interest, entirely outside the area of interest, or bounding boxes may intersect the area of interest, in accordance with an embodiment of the present invention.

FIG. 4 illustrates how bounding boxes 402, 404, 406 may be entirely within the area of interest 408, e.g., bounding box 404; entirely outside the area of interest, e.g., bounding box 402; or bounding boxes may intersect the area of interest, e.g. bounding box 406.

We now provide an example of how to steganographically encode a 32-bit spatial key and a spatial bounding box in the red, green, and blue (RGB) values of a hypothetical bitmap image. Although we use a 32-bit spatial key for this example, keys of other length could easily be used, as will be appreciated by those of skill in the art. Assume:

K is a 32-bit spatial key $X_{min}$ is the minimum X coordinate corner of an X,Y bounding box in 32 bit signed integer coordinate space $X_{max}$ is the maximum X coordinate of a bounding box in 32 bit signed integer coordinate space $Y_{min}$ is the minimum Y coordinate corner of an X,Y bounding box in 32 bit signed integer coordinate space $Y_{max}$ is the maximum Y coordinate of a bounding box in 32 bit signed integer coordinate space Note that latitude and longitude can be converted to 32-bit signed integer coordinates by multiplying by 100,000 and dropping or rounding off the remainder.

Let each RGB value in the image be represented as a 24-bit hexadecimal number. It is typical to see RGB values represented as, for example "0xFFAABB", which means that the 8-bit red pixel has a hexadecimal value of FF, the green pixel has a value of AA and the blue pixel has a value of BB.

Each RGB value is used to encode 3-bits of information. Preferably, the least significant bit (LSB) of the red, green, and blue pixels is used. The three bits encoded by the RGB value can be extracted from a given RGB value by AND-ing the RGB value with a bitmask "0x010101". Such bitmask techniques are well-known in the art.

Figure 5:
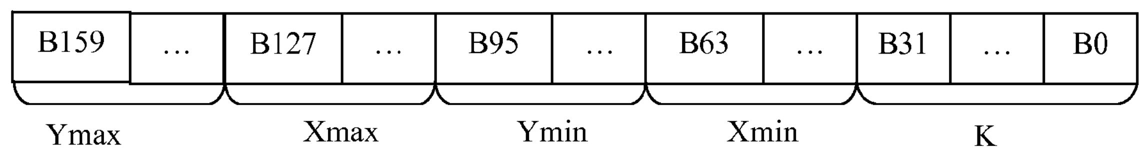
FIG. 5 illustrates integration of spatial key values into an image in accordance with an embodiment of the present invention.

Henceforth, when we refer to a byte of the image, we are referring to an individual R, G, or B value. For each R, G, or B value, we use only the least-significant bit (LSB) to steganographically encode information. FIG. 5 illustrates the bytes of an image. "B0" indicates byte zero of the image, "B31" indicates byte 31, etc.

In order to steganographically encode the 32 bits of spatial key K, we preferably use the first 32 bytes of the image. In each byte we will use the least significant bit of the byte to store a bit of K. As will be appreciated by those of skill in the art, other bytes could be used instead.

$X_{min}$, $Y_{min}$, $X_{max}$, and $Y_{max}$ are steganographically encoded in the same manner.

In an alternative embodiment, additional (X,Y)-coordinate pairs are steganographically encoded to accommodate bounding areas that are not limited to two coordinates.

In an alternative embodiment, additional data is encoded following encoded coordinates as described further below.

For vector formats that transmit images in cleartext, like Scalable Vector Graphics (SVG), a comment in the text file can be used to embed the spatial key. The hexadecimal value can represent either an encrypted or unencrypted spatial key:

<!–spatial key=0x34567854-->

Bounding boxes are encoded in a similar manner.

Although the present invention has been described with respect to bitmap and SVG images, those with skill in the art will appreciate the present invention has application to systems using JPEG, GIF, PNG, and a variety of other image formats.

In addition to the spatial key and bounding box, an alternative embodiment of this invention allows arbitrary information to be steganograpically encoded in the image. For example, one might desire to attach a guide book rating to a map showing the location of a restaurant.

Not-exhaustive examples of additional information that one might steganographically encode in the map image include:

Photographs

Arbitrary Keyword/value pairs

Freeform text

URLs

Postal codes

Preferably, one of the following methods is used to allow a search engine 102 crawling the web to be able to differentiate maps containing a spatial key from those that do not.

Trusted Source

In this method, the URL of the image is sufficient to determine that the source bytes contain a spatial key. For example, consider the URL for a Yahoo! Map posted in a real estate posting:

http://maps.yahoo.com/maps_result?addr=Somerville+Road+at+Melita&cs z=santa+r+CA&country=US In this case, "http://maps.yahoo.com/maps_result?" is sufficient to determine that the link points to a Yahoo! Map. If every map generated by Yahoo! embeds the spatial key and bounding box, then the web crawling search engine 102 can extract a spatial key and bounding box from all URL's beginning with "http://maps.yahoo.com/maps_result?".

Checksum

In this embodiment, a 32-bit checksum of the first several bytes, e.g., 160 bytes or bits steganographically encoded is provided using the bytes immediately following the first 160 bytes.

Web crawler 102 checks the checksum against the first 160 bytes. Note that using this method it is possible for any party knowing the checksum algorithm to spatially key any image.

Digital Signature

A digital signature of the image, for example a PGP signature, can be steganographically encoded using bytes immediately following the first several bytes, e.g., 160 bytes. The signature is generated by system 100 using a private key. The web crawler 102 that reads the image must know the public key to verify the image and its steganogrphically encoded spatial key and bounding box.

One advantage of this approach over a trusted source is that a spatially keyed image can be downloaded from its original source and reposted on a different URL. Likewise, an advantage of this method over the simple checksum is that it allows the originator of the image to be identified. The web crawler 102 maintains a list of public keys for the various providers of spatially keyed maps, and when needed runs the public key verification for each provider to perform differentiation.

Annotation

Many image formats support annotation. Annotation may be in the form of a comment, as described above with respect to vector formats, or in an annotation mechanism that is part of the file format itself. Where annotation is available, annotation can be used to identify an image as containing a steganographically encoded spatial key and bounding box.

Encryption

Encryption may be desired to prevent reverse-engineering of spatial key technology, or to allow the producer of the map image (e.g. "maps.xyz.com") to retain the exclusive ability to read the spatial keys—thus creating an exclusive spatial web-search capability for maps produced by xyz.com.

Conventionally-known algorithms such as DES or RSA can be employed to achieve this encryption. For example, $encrypt(K+X_{min}+Y_{min}+X_{max}+Y_{max}+Pad)\text{->}cyphertext$ shows an encryption algorithm being run on the concatenation of the spatial key, bounding box, and optional pad value, to produce the encrypted value (cyphertext). The pad value can be used eliminate the generation of insecure cyphertext.

The encryption mechanism can employ a private key to encrypt the spatial key and bounding box.

Figure 6:
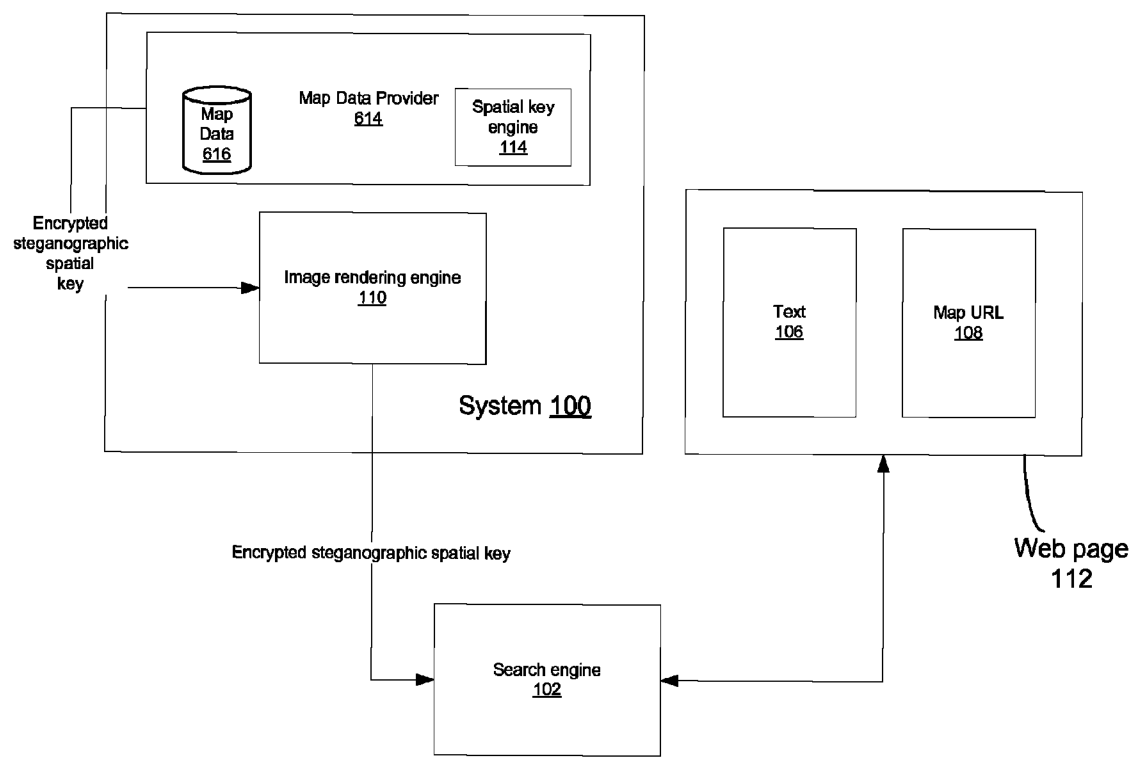
FIG. 6 illustrates how a map generator is used to encrypt and decrypt a spatial key and bounding box in accordance with an embodiment of the present invention.

FIG. 6 illustrates how encryption can be used in accordance with an embodiment of the present invention. A map data provider 614, provides map data 616 including an encrypted steganographic spatial key and bounding box to image rendering engine 110, which then provides the rendered map to search engine 102 as described above. When search engine 102 provides the map and correct encryption key to system 100, a decrypted spatial key and bounding box are preferably returned (not shown).

In one embodiment, the producer of an image may provide its own encryption of the spatial key and bounding box. Some reasons this might be useful include:

1) The map image-rendering-software provider has made decryption software available to parties that the image producer does not wish to share the spatial key with;
2) A public decryption key is available to parties that the image producer does not wish to share the spatial key with; or
3) The image producer wants to provide its own encryption in lieu of, or in addition to, encryption provided by the map image-rendering-software provider.

Illustrating once again a query and response in accordance with an embodiment of the present invention, consider the following example:

A user enters the query "find all homes within 1 mile of Highway 101 North."

a. search engine performs semantic analysis on query.
b. Search engine identifies "homes" as the desired search result
c. Search engine identifies "within 1 mile" as a spatial qualifier
d. Search engine identifies "Highway 101 N" as a road
e. Search engine uses overlay plugin to retrieve spatial key range covering a 1 mile swath (area of interest) around a selected geometry of highway 101 N. (for sake of example, consider returned key ranges covering the area of interest to be [0x12345671, 0x12345674], [0x12345695, 0x12345699]
f. Search engine retrieves all URLs and associated bounding boxes matching the "homes" criteria and having the correct spatial keys by searching in its database. The following is pseudocode for a database query: "SELECT URL AND BOUNDING_BOX WHERE KEYWORD='home|house|townhome|cabin' AND (SPATIALKEY>=0x12345671 AND SPATIALKEY<=0x12345674) OR (SPATIALKEY>=0x12345695 AND SPATIALKEY<=0x12345699)"
g. Search engine formulates search result webpage, discarding URLs returned from query of step f whose bounding box does not intersect the area of interest around highway 101 N used in step e.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the map image-rendering-software provider, map image provider and so forth may be provided in many or one module.

Some portions of the above description present the feature of the present invention in terms of algorithms and symbolic representations of operations on information. These algorithmic descriptions and representations are the means used by those skilled in the web search arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for indexing web pages, the method comprising:

crawling, by a computer, a plurality of web pages on a wide area network, each web page having text content and at least one image having an embedded spatial key;

for each of the crawled web pages:

extracting the spatial key from the image;

storing an association between the text content and the spatial key on a computer readable medium;

receiving a search request, the search request including a query and a location;

determining at least one spatial key associated with the location;

identifying the crawled web pages having text content relevant to the search query, the text content having an associated spatial key matching the spatial key associated with the location; and providing the identified web pages in response to the received query.

2. The method of claim 1, further comprising:

for each of the crawled web pages, extracting a bounding box from the image; and maintaining an association between the bounding box and the extracted spatial key.

3. The method of claim 2 wherein the bounding box is defined by two points.

4. The method of claim 1, further comprising:

for each of the crawled web pages, extracting a bounding area from the image, the bounding area defined by more than two points; and maintaining an association between the bounding area and the text content.

5. The method of claim 1 wherein the at least one image having a spatial key is hosted on a server other than a server hosting the web page.

6. The method of claim 5 wherein the server hosting the image is identified by a URL.

7. The method of claim 1 wherein the image is a map.

8. The method of claim 1 wherein the spatial key is steganographically encoded in red, green and blue values of the image.

9. The method of claim 1 wherein the at least one image includes steganographically encoded rating data and further comprising storing an association between the text content and the encoded data.

10. The method of claim 1 wherein the at least one image includes steganographically encoded photograph data and further comprising storing an association between the text content and the encoded data.

11. The method of claim 1 wherein the at least one image includes steganographically encoded keyword/value pairs and further comprising storing an association between the text content and the encoded data.

12. The method of claim 1 wherein the at least one image includes steganographically encoded rating data and further comprising storing an association between the text content and the encoded data.

13. The method of claim 1 wherein the at least one image includes steganographically encoded freeform text data and further comprising storing an association between the text content and the encoded data.

14. The method of claim 1 wherein the at least one image includes steganographically encoded URL data and further comprising storing an association between the text content and the encoded data.

15. The method of claim 1 wherein the spatial key and a checksum are steganographically encoded in the image.

16. The method of claim 1 wherein a digital signature is steganographically encoded in the image.

17. The method of claim 1 wherein the spatial key is encrypted and extracting the spatial key includes decrypting the spatial key.

18. A system for indexing web pages, comprising:

a processor;

a memory, coupled to the processor;

a search engine, executed by the processor and stored in the memory, adapted to:

crawl a plurality of web pages on a wide area network, each web page having text content and at least one image having an embedded spatial key;

for each of the crawled web pages to:

extract the spatial key from the image; and store an association between the text content and the spatial key on a computer readable medium;

receive a search request, the search request including a query and a location;

determine at least one spatial key associated with the location;

identify the crawled web pages having text content relevant to the search query, the text content having an associated spatial key matching the spatial key associated with the location; and provide the identified web pages in response to the received query.

19. A non-transitory computer-readable medium storing a computer program product for indexing web pages over a wide area network, computer program product including program code for:

crawling, by a computer, a plurality of web pages on a wide area network, each web page having text content and at least one image having an embedded spatial key;

for each of the crawled web pages:

extracting the spatial key from the image;

storing an association between the text content and the spatial key on a computer readable medium;

receiving a search request, the search request including a query and a location;

determining at least one spatial key associated with the location;

identifying the crawled web pages having text content relevant to the search query, the text content having an associated spatial key matching the spatial key associated with the location; and providing the identified web pages in response to the received query.

* * * * *